3,012,889
METHOD FOR THE MANUFACTURE OF CREAM AND NEUFCHATEL CHEESE

Carl L. Angerer and George W. Wilson, Van Wert, Ohio, assignors to The Borden Company, New York, N.Y., a corporation of New Jersey
No Drawing. Filed Feb. 25, 1960, Ser. No. 10,882
8 Claims. (Cl. 99—116)

This invention relates to improvements in the manufacture of the types of cheese respectively referred to in the Regulations of the Food & Drug Administration as "cream cheese" and "Neufchatel cheese" (see Federal Register, Dec. 23, 1942, pp. 10758–9).

One object of our invention is to provide a process by which cream cheese curd and Neufchatel curd may be separated from the whey by centrifuging without exposing the ripened mix to the high temperatures heretofore used to enable the curd to be effectively separated by centrifuging. The process of the present invention has the advantage that the separated curd, when desired, can be used for making "cold pack" cream cheese or Neufchatel cheese, which has the characteristic "cold pack" flavor of fresh conventional "cold packed" cheese of these types made by the conventional bagging process. This advantage results from the fact that in the present process, as in the conventional bagging process, the mix after ripening and the resulting cheese obtained from it need never be subjected to the high temperatures heretofore required if a centrifuging process was to be used in making such cheese.

Another object of the present invention is to provide an efficient process for manufacturing cream cheese and Neufchatel cheese, in which the curd may be separated from the whey by centrifuging without using the elevated temperature method described and claimed in Link Patent 2,387,276, issued October 23, 1945. According to that Link patent, the ripened mix is conditioned for the centrifugal separation of the whey by heating the ripened mix to a temperature between about 135 and 170° F. or higher and is centrifuged at substantially such temperature. The process of that patent has been very extensively used in commercial operations by the assignee of that patent and by its successor corporations. In such practice, it was found important to heat the mix to temperatures at least as high as 160 to 180° F. for efficient operation. The use of centrifuging temperatures above 160° F. and above 180° F., respectively, is also recommended in the Strezynski Patents 2,432,829 and 2,461,129. These Strezynski patents describe centrifugal apparatus suitable for separating cheese curd from whey of the kind that has been heretofore used in the commercial practice of the method of the aforesaid Link patent by the assignee of that patent.

Separating the curd from the whey by centrifuging has many obvious advantages over the conventional bag separating methods that are still in common use. Such advantages include savings in time, in space, and in labor, savings of ingredient losses, and better sanitary conditions. Since the method of said Link patent has been very extensively and successfully practiced by the assignee of that patent and its corporate successors but has not yet been made available for use by others, there has long been a demand for a process whereby the curd can be efficiently separated from the whey by centrifuging without using the elevated temperature method described and claimed in said Link patent. The present invention provides a method suitable for that purpose.

The method of the present invention may be carried out as follows:

A sweet mix is first prepared as in the usual conventional procedure, that is sweet milk and cream are blended to obtain a mixture having an appropriate amount of butter fat for producing the desired product. If the product wanted is cream cheese, any butter fat content between about 11% and about 20% can be used, although about 12% is usually most convenient for that purpose.

Like conventional methods, the present method permits the use in preparing the sweet mix of equivalent proportions of reconstituted milk solids and cream in place of all or part of the fresh milk and cream that it is preferable to employ.

When Neufchatel cheese, instead of cream cheese, is the desired product, the sweet mix is prepared in the same way except that a butter fat content of between about 6.5% and 11.0% is used. About 7.0% butter fat is usually a convenient proportion for a Neufchatel sweet mix.

The batch of sweet mix may be prepared in any size convenient to handle with the available equipment and supplies of a particular plant. Batches of sweet mix weighing around 20,000 pounds are often convenient.

After preparing the sweet mix, the next step is to add to the sweet mix a small amount of gum of one of the kinds that have heretofore been used in the hot packing of finished cream cheese for the purpose of preventing excessive leakage of moisture. The gums suitable for this purpose include carob or locust bean gum, karaya gum, tragacanth gum, gelatin, and algin. Of these the vegetable gums, and particularly locust bean gum, are preferred. The proportion of gum solids added should usually be between about .01% and 0.2% by weight of the sweet mix. About 0.1% of locust bean gum works particularly well in the present process. The amount of gum added to the sweet mix should, in any event, be less than the maximum amounts of gum authorized for use in cream and Neufchatel cheese by the Regulations of the Food & Drug Administration. However, less than one fifth of that maximum amount is usually sufficient and more satisfactory for addition to the sweet mix for the purpose of the present invention.

For adding the gum to the sweet mix, it is usually convenient first to dissolve or disperse the gum in a little water and then stir the solution or dispersion into the sweet mix.

After adding the gum, the sweet mix is stirred and heated, for example, to a temperature of 165° F. over a period of about half an hour. This heating serves not only to pasteurize the sweet mix but also to activate the gum with the mix, so that the gum addition will cause the unusual effects in the mix after ripening which are hereinafter described. The temperature required to activate the gum with the sweet mix varies somewhat with the heating time and the particular gum used. A temperature between about 160° F. to 180° F. is usually satisfactory and about 165° F. is usually about optimum. However, any temperature-time combination that is sufficient not only to pasteurize the sweet mix but also to activate the gum that has been added to the mix can be used.

The pasteurized gum reacted sweet mix is next pumped while hot through a homogenizer at a suitable pressure, for example, about 2,500 pounds per square inch. Homogenizing the sweet mix (either before or after the pasteurizing of it) is a part of the old conventional procedure for making cream and Neufchatel cheese. Homogenizing the special sweet mix of this invention also performs the additional function of perfecting the distribution and activity of the gum.

After homogenizing, the sweet mix is cooled to a suitable setting temperature, for example, about 72° F., and is run into a suitable setting tank, for example, a conventional coil pasteurizer or any other tank of suitable size provided with stirring means. The sweet mix is then inoculated as in the usual conventional process with a conventional amount and kind of starter. Also, in the process of the present invention, a little rennet is added. The proportion of rennet should not be less than .1 cc. nor more than 3 ounces per 1,000 pounds of mix. About 14 cc. (½ oz.) of rennet to each 1,000 pounds of mix, is the preferred proportion. The stirrer is advantageously used for a few minutes to mix in the starter and rennet. The batch is then allowed to set and ripen usually overnight at a temperature around 70 to 74° F. as in conventional practice until the usual conventional mix acidity of about .7 to .9% is reached.

The setting time and temperature, the amount of starter, and the final acidity of the mix, are all in accord with the usual conventional cream cheese practice. In such conventional practice, the addition of a small amount of rennet is optional but not usual. In the process of the present invention, the small rennet addition is important.

After the mix has set and ripened to the proper acidity, the stirrer is operated for a sufficient time to break up the ripened mix at the setting temperature (e.g., about 70 to 74° F.). Such stirring soon results in breaking the ripened mix into small curd particles floating around in substantially clear whey. The special ripened mix of this invention differs vitally from conventional ripened mixes in that no heating is required to accomplish this result. Violent or prolonged stirring is not needed and should be avoided. About 2 to 5 minutes' stirring in a conventional coil pasteurizer or in a vertical tank having equivalent stirring means, is usually enough for the purposes of the present invention.

As the mix is broken up by stirring, it is often advantageous to dilute it with about 6 to 10% by weight of tap water, especially when the mix is a cream cheese mix, which usually contains 12% or more of butter fat. The diluting water used is preferably about the same temperature as the mix (i.e., around 70 to 74° F.), but colder or warmer diluting water may be used since within wide limits its temperature is not important. In the case of mixes such as are used for making Neufchatel cheese, for example mixes containing about 8% of butter fat, this diluting step is often unimportant and may be omitted.

The broken up ripened mix (after dilution with water when the above described diluting step is used) is then pumped continuously through a tubular heater or other suitable warming device to a small gravity feed surge tank for feeding the mix to the centrifuge.

The centrifuge employed is preferably the type disclosed in the Strezynski Patents 2,432,829 and 2,461,129. This type of centrifuge has been marketed by the De Laval Separator Company under the trade designation "De Laval AA-00 centrifuge." Such centrifuges are supplied with different sizes of feed nozzles and serum nozzles. It has been found that a 14.2 mm. feed nozzle with a 23 mm. serum nozzle worked well for use in the process of the present invention.

The temperature of the mix fed to the centrifuge is advantageously kept within the range of 108° to 115° F. In practice, it has been found that 110° F. is a very satisfactory temperature. Much higher centrifuging temperatures can be employed but the use of high centrifuging temperatures has little, if any, advantage in the process of the present invention, and the use of temperatures above 120° F. is not recommended. Centrifuging temperatures above about 130° F. would lose advantages of the present invention for use in making superior "cold packed" cream or Neufchatel cheese, and also might be asserted to trespass upon the elevated temperature centrifuging method of the aforesaid Link patent.

The curd separated by the process of the present invention may be "cold packed" as cream cheese or Neufchatel cheese in accordance with conventional procedure. Such "cold packed" cheese has a flavor and texture at least as good as can be produced by the conventional bagging method and superior to that obtained when a ripened mix is heated to high temperatures for centrifuging, and after centrifuging is cooled down again for so-called cold packing. The shelf life of "cold packed" cream cheese or "cold packed" Neufchatel cheese made by the method of the present invention is generally somewhat longer than that of such cold packed cheese made by the conventional bagging process, because the centrifuging procedure reduces the amount of handling and other opportunities for contamination involved in the manufacturing procedure.

A long shelf life can be obtained by hot packing the cheese in the conventional manner.

The small amount of gum which is added to the sweet mix for the purposes of the present invention is usually much less than is needed for moisture retention in hot packing cream cheese or Neufchatel cheese (regardless of what procedure may have been used for making the cheese). Hence, in hot packing the product of the present invention, enough additional stabilizing gum should be added as in conventional hot packing to meet the moisture retention requirement. Approximately .15% (which is far less than the .5% maximum authorized by the Food & Drug Administration Regulations) is usually sufficient when hot packing the product of the present invention. When the product of the present invention is cold packed, no additional stabilizer given is needed for moisture retention and preferably none is added.

It is obvious from the foregoing that various changes and modifications may be made in the details of the procedure without departing from the spirit and scope of this invention.

The invention claimed is:

1. An improved process for producing cream cheese and Neufchatel cheese, which comprises the following steps: preparing a mixture of milk and cream having a butter fat content within the range heretofore known to be suitable for making such cheese; adding to said mixture a gum selected from the class which consists of locust bean gum, karaya gum, tragacanth gum, algin, and gelatin, the weight of the gum added being more than 0.01% of the weight of the mixture to which the gum is added but substantially less than a weight of gum such that the total weight of the solids contained therein would be more than 0.5% of the weight of the finished cheese; heating said gum containing mixture to a temperature and for a time sufficient both to pasteurize said mixture and activate said gum addition therein; homogenizing said mixture; cooling said mixture to a setting temperature within the range heretofore known to be suitable for making such cheese; adding a kind and amount of starter heretofore known to be suitable for making such cheese; adding a quantity of rennet smaller than three (3) ounces of rennet per 1,000 pounds of mix; allowing said mix to set and ripen until a mix acidity of about .7 to .9%, heretofore known to be suitable for making such cheese, is reached; stirring said ripened mix at the setting temperature sufficiently to break said ripened mix into particles of curd floating around in whey; and separating said curd particles from said whey by centrifuging while keeping said ripened mix at all times at a temperature below 130° F.

2. Process in accordance with claim 1, in which said gum addition is locust bean gum in an amount weighing between about .04% and 0.2% of the weight of the sweet mix to which it is added.

3. Process in accordance with claim 1, in which the mix after setting and before centrifuging is diluted with about 6 to 10% of water.

4. Process in accordance with claim 1, in which said ripened mix temperature below 130° F. is between about 110 and 120° F.

5. Process in accordance with claim 1, in which said ripened mix temperature below 130° F. is between about 108° and 115° F.

6. Process in accordance with claim 4, in which the curd after separation by centrifuging is packed cold to produce finished cold packed cheese.

7. Process in accordance with claim 1, in which the curd after separation by centrifuging is hot packed to produce finished hot packed cheese.

8. Process in accordance with claim 1, in which the gum added to the sweet mix is locust bean gum in an amount weighing about 0.10% of the sweet mix, in which the sweet mix is heated for a period of about half an hour at a rate sufficient to raise its temperature to about 165° F. to pasteurize the mix and activate the gum therein, in which the rennet added to the sweet mix before setting is about 14 cc. of rennet per 1,000 pounds of mix, and in which the temperature of the ripened mix after setting is kept below 120° F. until after the curd has been separated from the whey by centrifuging.

References Cited in the file of this patent

UNITED STATES PATENTS

| | | |
|---|---|---|
| 567,522 | Turner | Sept. 8, 1896 |
| 2,098,764 | Sharpless | Nov. 9, 1937 |
| 2,160,159 | Lundstedt et al. | May 30, 1939 |
| 2,712,999 | Strezynski | July 12, 1955 |